United States Patent [19]

Kufrin et al.

[11] 4,131,273
[45] Dec. 26, 1978

[54] RECORD CARD FEEDING APPARATUS

[75] Inventors: Fred W. Kufrin, Janesville; John H. Carpentier, Ft. Atkinson, both of Wis.

[73] Assignee: Oce-Industries Inc., Chicago, Ill.

[21] Appl. No.: 796,677

[22] Filed: May 13, 1977

[51] Int. Cl.² .................. B65H 5/10; B65H 9/04; B65H 9/10
[52] U.S. Cl. .................. 271/4; 214/1 BD; 271/226; 271/236; 271/241; 271/253; 271/268; 271/DIG. 9
[58] Field of Search .............. 271/4, 3, 5, DIG. 9, 271/268, 267, 84, 85, 10, 14, 118, 236, 241, 253, 226; 353/113, 118, 27 R, 27 A; 214/1 BD

[56] References Cited

U.S. PATENT DOCUMENTS

| | | | |
|---|---|---|---|
| 3,008,708 | 11/1961 | Caudle et al. | 271/5 |
| 3,180,637 | 4/1965 | Hunt | 271/225 |
| 3,514,098 | 5/1970 | Ostwald | 271/118 X |
| 3,566,524 | 3/1971 | Irasek | 271/10 X |
| 3,926,426 | 12/1975 | Toriumi et al. | 271/DIG. 9 |

FOREIGN PATENT DOCUMENTS 1123552  8/1968  United Kingdom .................. 353/113

*Primary Examiner*—Bruce H. Stoner, Jr.

*Attorney, Agent, or Firm*—Albert C. Johnston; Ronald A. Clayton

[57] ABSTRACT

An apparatus for feeding record cards to and from a utilization station in a record card utilization machine comprises a support housing for a card origination hopper and a card collection hopper, which is mounted below the origination hopper. A transfer carriage is mounted for reciprocal, pivoted movement from a first position where it receives a card from the origination hopper, to a second position at the utilization station where the card is utilized, and back to the same first position where it returns the card to the collection hopper. A card feeding and returning mechanism is associated with the hoppers to feed cards to and remove cards from the carriage at different times in the sequence of operation of the apparatus, but nevertheless with the carriage at the same first position in its path of reciprocal, pivoted travel. An operation aligning a card received on the carriage in the utilization station, performed by coaction of the card with an alignment platform, also sets up the card for receipt by the feeding and returning mechanism for return to the collection hopper. A transverse carriage and card aligning operation is performed by interaction of a cam, mounted at the utilization station, and a cam follower, mounted on the carriage, when the carriage is pivoted to its second position.

23 Claims, 14 Drawing Figures

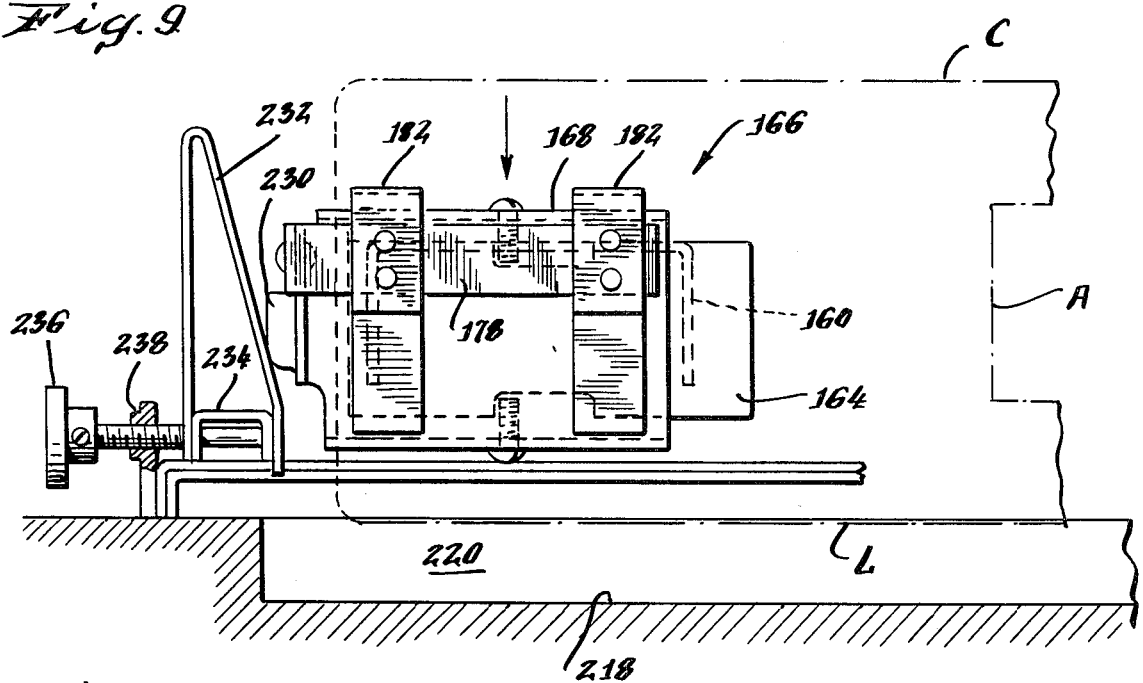
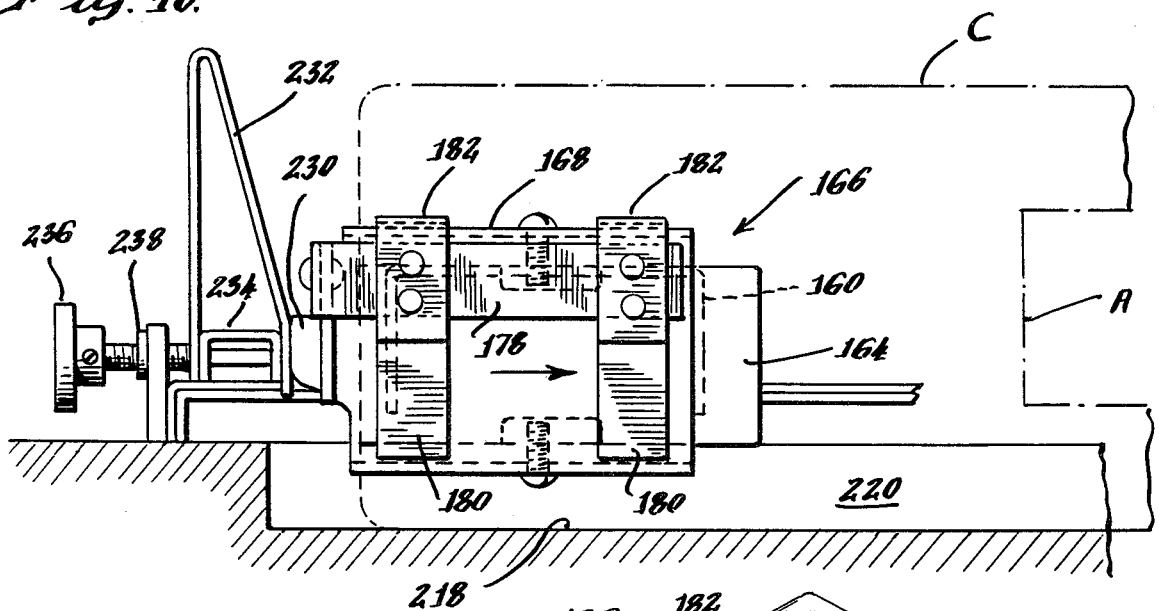
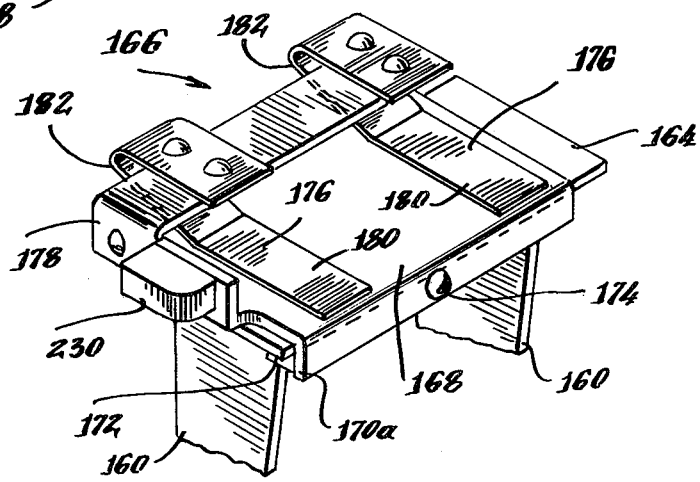

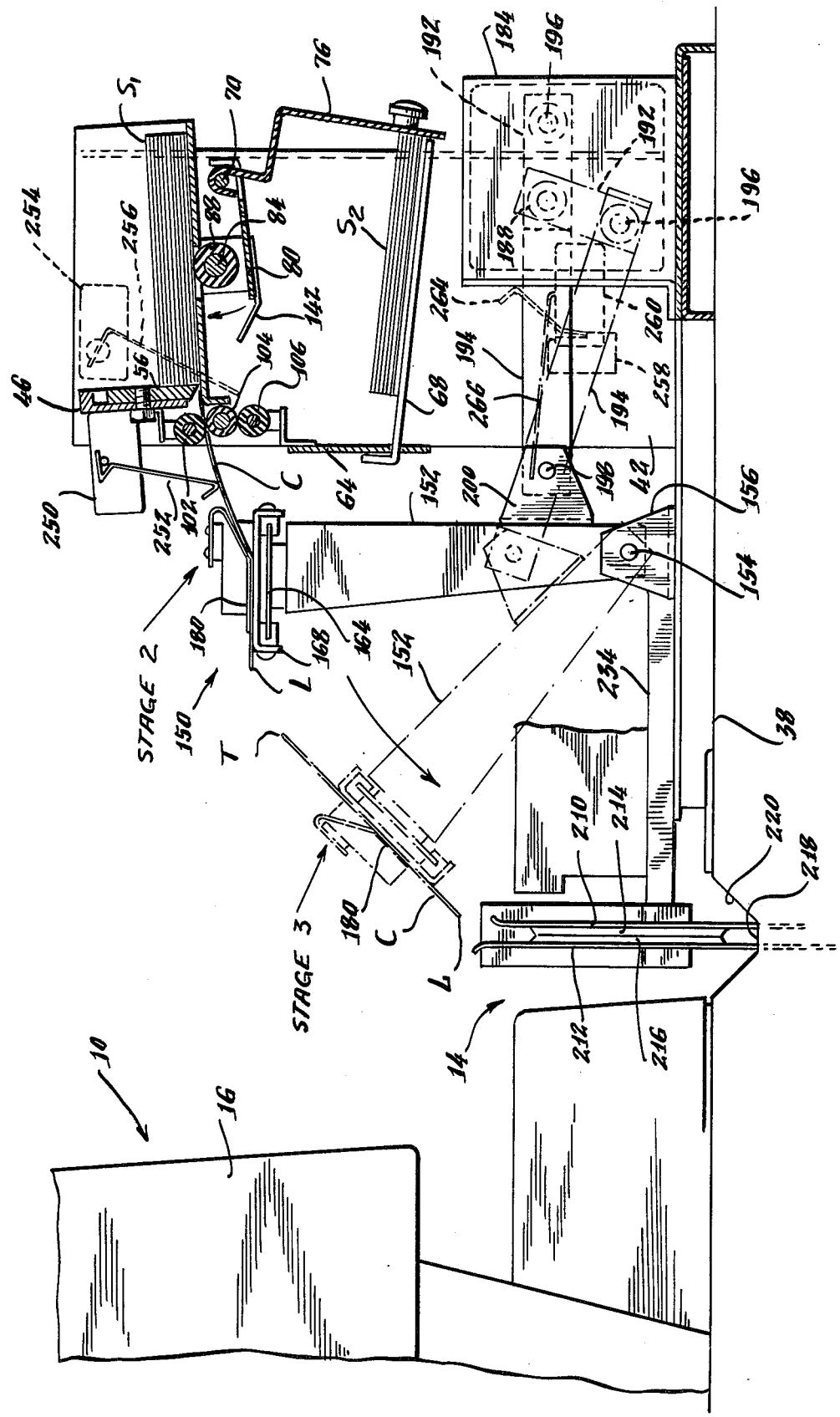

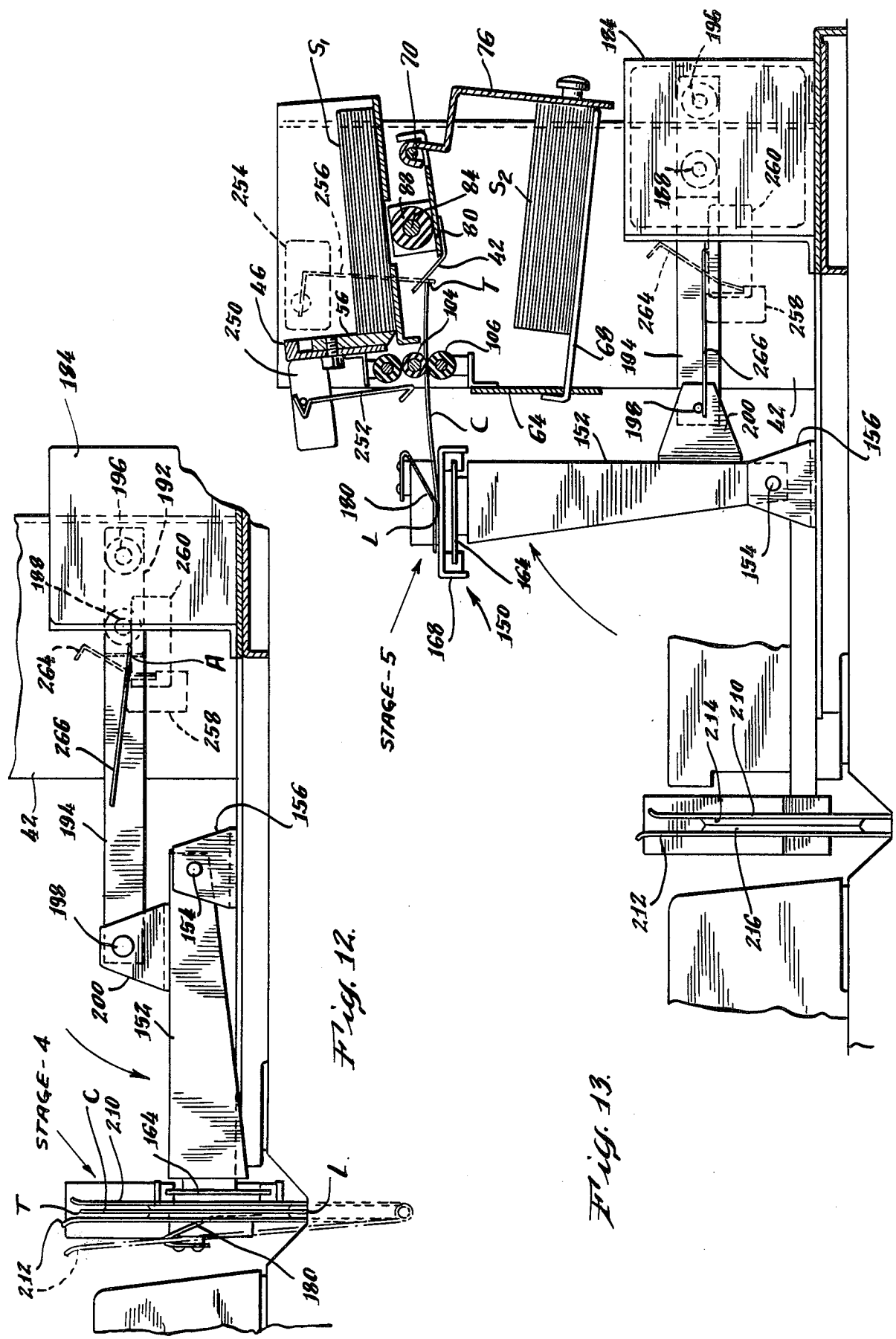

RECORD CARD FEEDING APPARATUS

SPECIFICATION

The present invention relates to an apparatus for feeding record cards to and from a utilization station in a utilization machine. In particular, the invention relates to an apparatus for feeding cards, commonly called aperture cards, each of which supports an individual microfilm frame in an aperture, to a machine for viewing or for viewing and reproducing the image carried by the microfilm frame.

Many developments have been made in recent years to improve record keeping operations. Perhaps the most important of these is the development of microfilm recording techniques that permit recordation of information, contained in ordinary documents, on photographic film which may later be viewed and/or photocopied. Because the indicia of information recorded on microfilm is substantially reduced in size from that carried on the original documents, far more information may be conveniently stored in a given space.

Several storage techniques have evolved since the advent of microfilm reproduction. One technique involves recordation of information on an elongated strip of microfilm that is stored on a reel in the same fashion as conventional photographic movie or strip film. However, this technique has several disadvantages. Notably, with this technique it is inconvenient to retrieve information stored in the center or at the end of a long microfilm strip. Further, retrieval of such information often requires that the entire reel be removed from storage and viewed or at least passed through an appropriate reading and/or printing machine.

A second technique of microfilm storage, which has been developed to minimize certain problems characteristic of the first, known as the "unitized" microfilm system, involves the copying onto an individual microfilm frame relatively small amounts of information which are likely to be retrieved at a later time. The individual frame is then mounted in a conventional record card of the type widely used in record-controlled accounting and tabulating systems that is provided with an aperture having a depressed margin. The microfilm frame is inserted and permanently secured in this margin. The card may then be used in a microfilm reading-printing machine that permits the microfilm to be viewed and/or photocopied.

The "unitized" microfilm system permits easy retrieval of specific information contained on an individual card. Aperture cards may be indexed in any order and may be rearranged at any time. The card may also contain information in the form of encoding perforations that permit it to be handled by other data processing equipment for indexing or any other similar operation.

Since aperture cards of the type described above ordinarily are of standardized size and composition and may carry standardized encoding information, they may be readily used by conventional card processing equipment. However, in order for such cards to be used by machines that permit viewing and/or reproduction of the microfilm information, the card must be properly fed to and aligned in such machines. The feeding and alignment function may be performed manually. However, when large quantities of information recorded on microfilm frames carried in many cards must be inspected, it is most convenient to employ an automatic card handling apparatus.

Apparatus for automatically handling microfilm aperture cards have been proposed in the past. For example, U.S. Pat. No. 3,180,637 (Hunt) discloses a record card feeding apparatus which is incorporated in an automatic xerographic processing system. Microfilm aperture cards are fed serially to an optical scanning system to have the indicia recorded on the frames projected onto a sensitized surface of a rotating xerographic drum which is well known in the xerographic photocopying process. This card handling aparatus feeds the microfilm aperture cards to a card carriage that transports them past the optical axis of a projection system in synchronism with the movement of the sensitized xerographic drum.

The Hunt apparatus is relatively complex in that it requires apparatus for both feeding record cards to the carriage and apparatus for ejecting cards from the carriage. Moreover, each card is tightly gripped in the carriage and the entire carriage is moved for proper microfilm utilization by the reading and printing machine. Accordingly, the device of the Hunt Patent is characterized by certain drawbacks.

The present invention is intended to overcome these and other drawbacks characteristic of prior art record card feeding systems. In particular, the preferred embodiment of the present invention is compact and may be retrofitted to an existing record card utilization machine such as a microfilm reader-printer. It is also mechanically simple yet delivers a record card to a utilization station in the utilization machine in a precise position for proper utilization.

In its preferred embodiment, the record card feeding apparatus of the present invention comprises a support housing which is formed with a card origination hopper and a card collection hopper. The collection hopper is mounted below the origination hopper. An aperture card transfer carriage is mounted in the support housing for reciprocal, pivoted movement from a first position in the proximity of both hoppers to a second position in operative proximity to the utilization station. A card feeding and returning mechanism is associated, in the support housing, with the hoppers to feed a record card from the origination hopper to the transfer carriage when in the first position. The carriage is then pivoted by a driving system to the utilization station where a microfilm frame mounted in it may be viewed or photocopied. The driving mechanism then reciprocates the transfer carriage back to the same first position where the card feeding and returning mechanism removes the card from it and ultimately deposits the card in the collection hopper.

The utilization station is equipped with an alignment platform. The transfer carriage is equipped with a cooperating card gripping head to which a card is fed by the feeding and returning mechanism. This mechanism is arranged so that the leading edge of each card fed to the transfer carriage projects at least a fixed distance beyond a margin of the gripping head. Moreover, the fixed distance is greater than the distance of closest approach of the gripping head to the alignment platform when the transfer carriage is in its second position. Therefore, when the carriage is so reciprocated, a card carried in the gripping head abuts the alignment platform for proper alignment in the utilization station.

In addition, the gripping head has a smaller dimension in the direction of its pivoted movement then the dimension of the record card from its leading to a trailing edge. Therefore, abutment of the leading card edge with the alignment platform causes the trailing edge to project rearwardly beyond an opposing margin of the gripping head. This coaction of the card and platform sets up the trailing card edge for receipt by the feeding and returning mechanism, upon return of the carriage to its first position, for ultimate delivery to the collection hopper.

The gripping head includes flexure springs which oppose a pressure plate to hold a card thereon with moderate pressure that is not sufficient to prevent movement of the card when its leading edge abuts the alignment platform. Furthermore, the flexure springs are equipped with deflecting portions that guide a card delivered from the feeding and returning mechanism onto the pressure plate. However, upon return of the transfer carriage to its first position, the trailing edge of the card is fed directly back into the feeding and returning mechanism for delivery to the collection hopper.

Accordingly, the mechanical assembly described above feeds a record card from an upper origination hopper to a transfer carriage in a first position and returns the card for delivery to a lower collection hopper when the carriage is reciprocated back to the same position. The apparatus of the invention also automatically aligns a leading edge of a record card in the utilization station for proper viewing and copying of a microfilm frame held therein.

The gripping head is mounted with the transfer carriage so that it may be moved transversely of the plane of the pivoted carriage travel. Further, the gripping head has a follower formed to engage a cam or ramp mounted at the utilization station. When the transfer carriage is reciprocated to its second position, the follower engages the cam to transversely shift the gripping head and simultaneously shift a card received thereon. The cam may be adjusted so that the degree of shift imparted to the gripping head is appropriate to align the card transversely in the utilization station.

The record card feeding apparatus of the invention, described in summary above, may be operated in a number of modes. For example, it may be operated in a manual mode for sequentially, selectively feeding record cards to the utilization station of a microfilm reader-printer. Alternatively, the apparatus may be operated in an automatic mode for automatically, sequentially feeding record cards to a reader-printer where each associated microfilm frame is automatically copied.

Thus, it is an object of the present invention to provide a record card feeding apparatus which is relatively mechanically uncomplicated and which may be retrofitted to existing card utilization machines, such as microfilm reader-printers.

It is also an object of the present invention to provide a record card feeding apparatus that includes a feeding and return mechanism which operates in conjunction with a transfer carriage to feed a card from an origination hopper to the transfer carriage for delivery to a utilization station, yet which returns the record card to a collection hopper when the carriage is reciprocating to the same position at which it received the card. In this connection, it is a further object of the invention to provide a card feeding apparatus that includes a gripping head which lightly holds a record card so that it may be properly aligned at a utilization station by abutting an alignment platform. The coaction of the card with the platform further sets up the card to be returned to the card feeding and return mechanism.

It is another object of the invention to provide a record card feeding apparatus which transversely aligns a record card by shifting at least a portion of the transfer carriage.

Other objects, aspects and advantages of the present invention will be pointed out in, or will be understood from, the detailed description provided below in conjunction with the accompanying drawings.

FIG. 8 is an enlarged perspective view of the transfer carriage gripping head.

FIG. 9 is a elevational view of the initial engagement of the gripping head follower with the cam or ramp, prior to abutment of the carried card with alignment platform.

FIG. 10 is an elevational view, similar to FIG. 9, with the gripping head moved to its final transverse position and the carried card in abutment with the alignment platform.

FIG. 11 is a vertical cross-sectional view, similar to FIG. 3, showing the apparatus at second and third stages in its sequence of operations.

FIG. 12 is a second partial vertical cross-sectional view showing the apparatus at a fourth stage in its sequence of operations with the transfer carriage at the second position.

FIG. 13 is a third vertical cross-sectional view showing the apparatus at a fifth stage in its sequence of operations with the transfer carriage reciprocated back to its first position, delivering a card to the feeding and returning mechanism.

A. THE ENVIRONMENT OF THE RECORD CARD FEEDING APPARATUS

Figure 1:
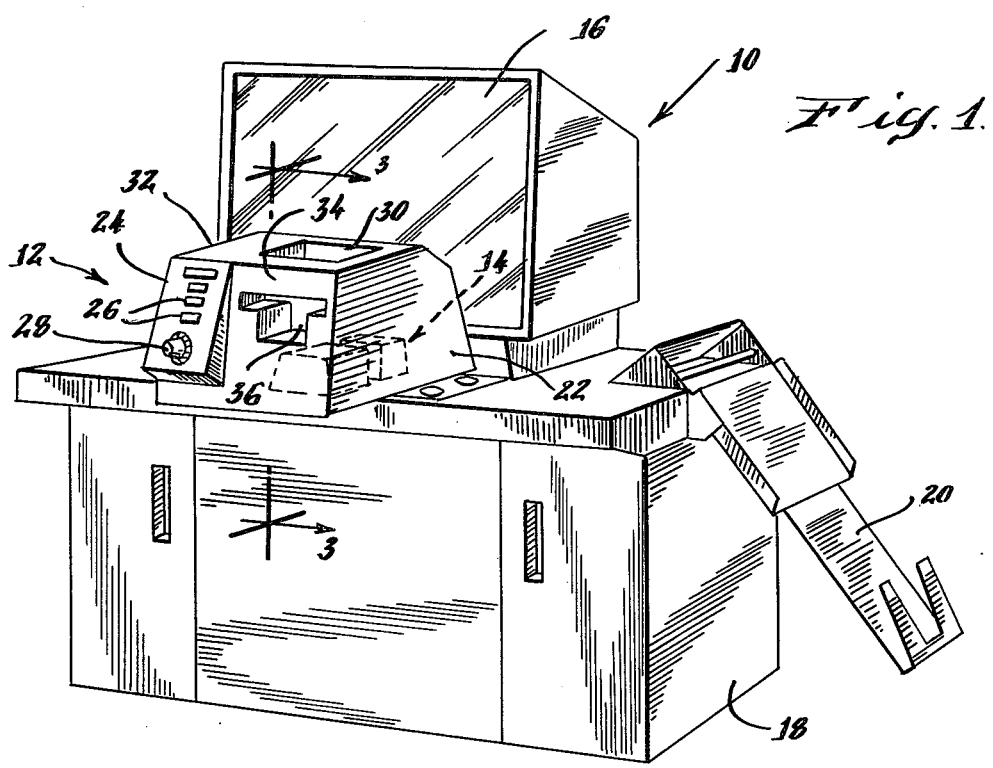
FIG. 1 is a perspective view of a microfilm reader-printer on which is installed a record card feeding apparatus constructed in accordance with the present invention.

FIG. 1 illustrates a microfilm reader-printer, generally indicated at 10, which may be fitted with a record card feeding apparatus, generally indicated at 12, constructed in accordance with present invention. The illustrated microfilm reader-printer is marketed by Oce' Industries, Inc., 6500 North Lincoln Avenue, Chicago, Illinois 60654, the assignee of the present invention, and has a commercial designation "Oce' 3600". However, it is to be understood that the record card feeding apparatus of the present invention may be adapted for use with any other microfilm reader-printer that utilizes microfilm aperture cards or with any other record card utilization apparatus that may have record cards being sequentially fed thereto and retrieved therefrom.

The microfilm reader-printer 10 comprises a utilization station 14, illustrated in phantom lines in FIG. 1, that receives a record card, which carries microfilm frame, for projection of the microfilm image on a screen 16 by an optical system (not shown). The reader-printer 10 also comprises a photocopying apparatus housed in a main cabinet 18 which can be actuated to photocopy information contained on the microfilm frame. A chute 20 is provided to receive the photocopies which are made and ejected from the cabinet.

The reader-printer may be adapted for automatic operation or may be used in a manual mode. That is, it may be set to automatically make a fixed number of copies of the indicia born by each microfilm frame fed to it. Alternatively, it may be operated to receive aperture cards to be viewed individually by an operator who can selectively make photocopies of the recorded indicia.

The record card feeding apparatus 12 has several functions. First, it feeds cards serially from an origination hopper to the utilization station 14 by means of a transfer mechanism. At the station, each record card is both horizontally and vertically aligned so that the microfilm frame mounted in it is properly positioned for projection on the screen and for copying by the reader-printer 10. After utilization, the apparatus returns the record card to a collection hopper where it is stacked along with other cards that have previously been viewed.

The structures and mechanisms for performing each of these functions will now be described in detail.

B. THE ORIGINATION AND COLLECTION HOPPER ASSEMBLY

Figure 3:
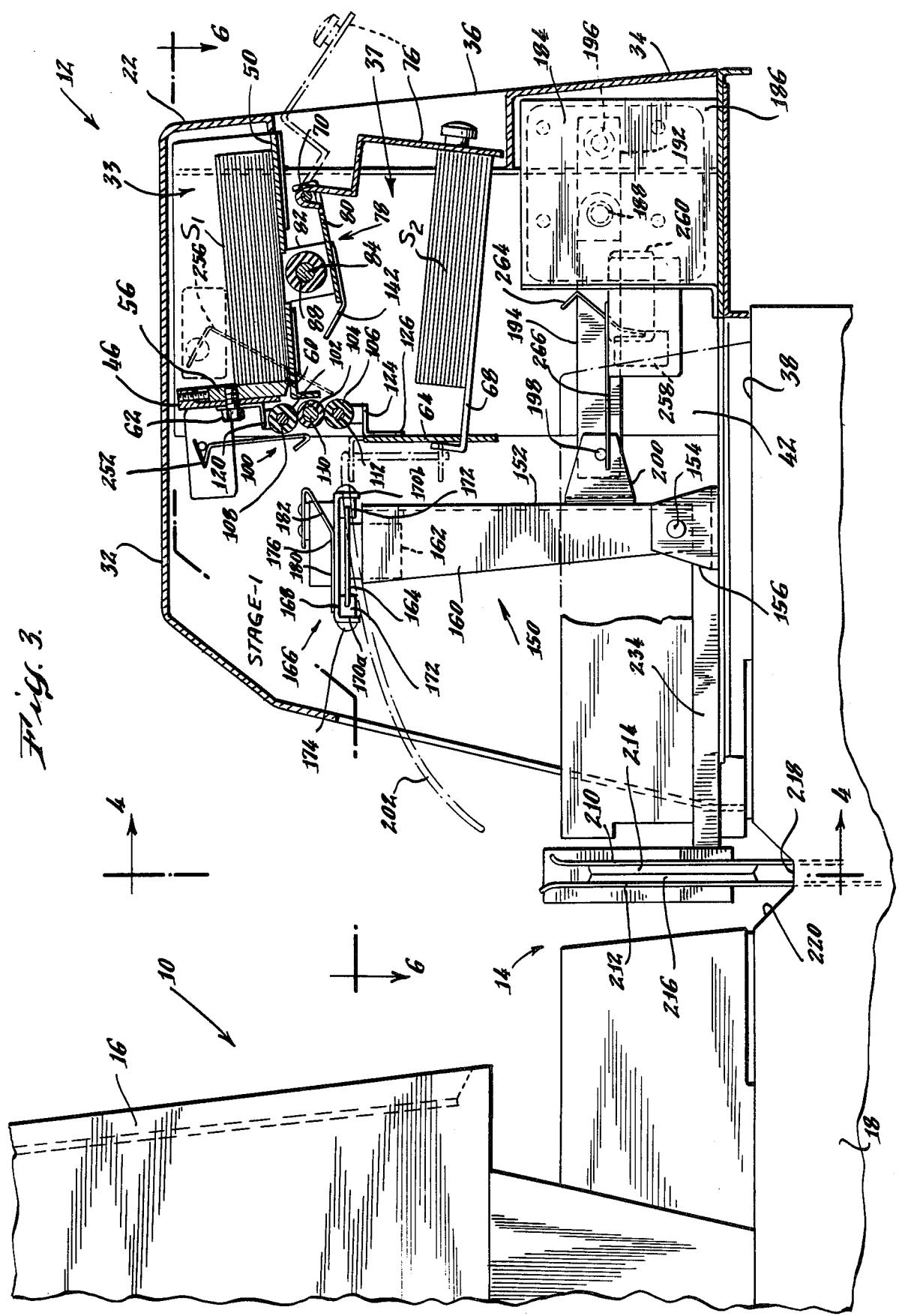
FIG. 3 is a vertical cross-sectional view of the card feeding apparatus taken through plane 3—3 in FIG. 1.
Figure 7:
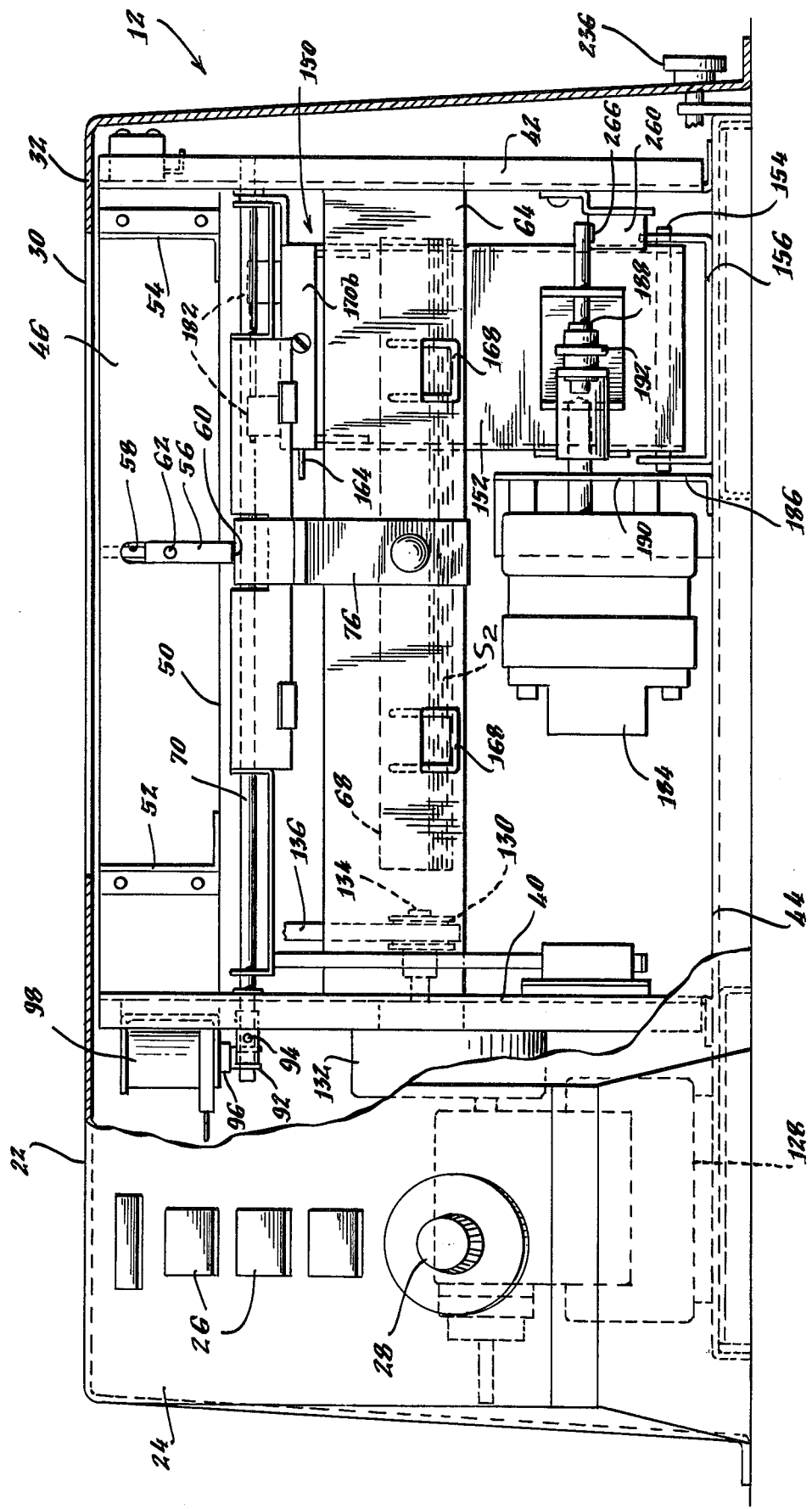
FIG. 7 is a front elevational view, partly broken away to show internal detail, of the apparatus of the invention.
Figure 14:
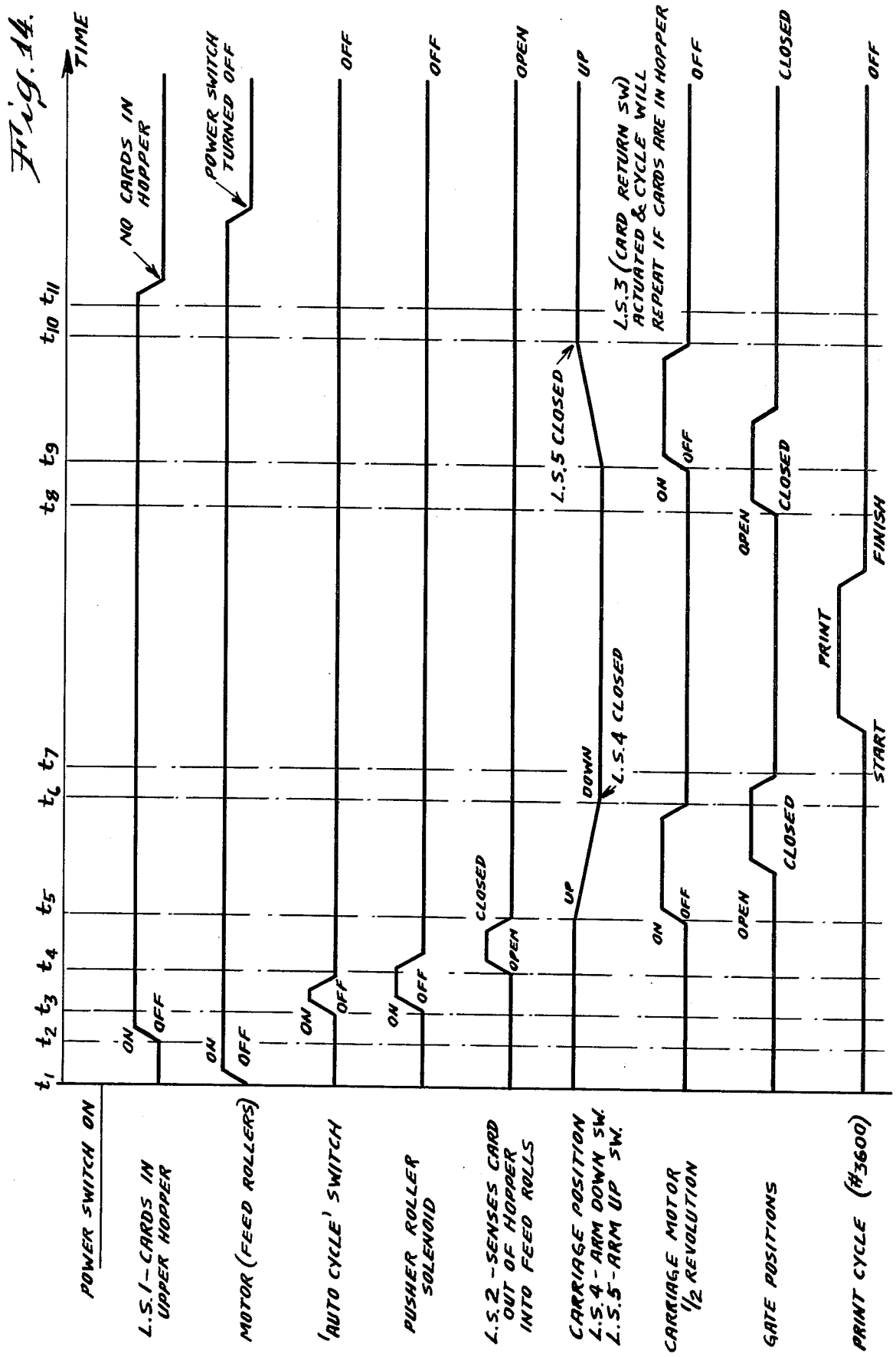
FIG. 14 is a diagram of the sequence of apparatus operations.

As shown in FIGS. 1, 3, and 7 the apparatus 12 includes a housing 22, the front of which includes a control panel 24. (Note: For purposes of this Specification and the concluding claims, the "front" of the apparatus is considered to be that portion of it faced by an operator who deposits record cards in the origination hopper and retrieves them from the collection hopper). Several control buttons 26 and a copy count dial 28 are mounted on the control panel and may be operated in a manner to be described in greater detail below. The housing 22 is also formed with an opening 30 in its top 32 that provides access to an origination hopper, generally indicated 33. The front panel 34 of the housing 22 is provided with a second opening 36 which provides access to a collection hopper, generally indicated at 37.

Referring to FIG. 3, the apparatus may be secured to the top 38 of the reader-printer 10 by any suitable means. For example, the apparatus may be bolted thereto or may be equipped with an interlocking rail arrangement which permits it to be installed on and later removed from the reader-printer.

Figure 4:
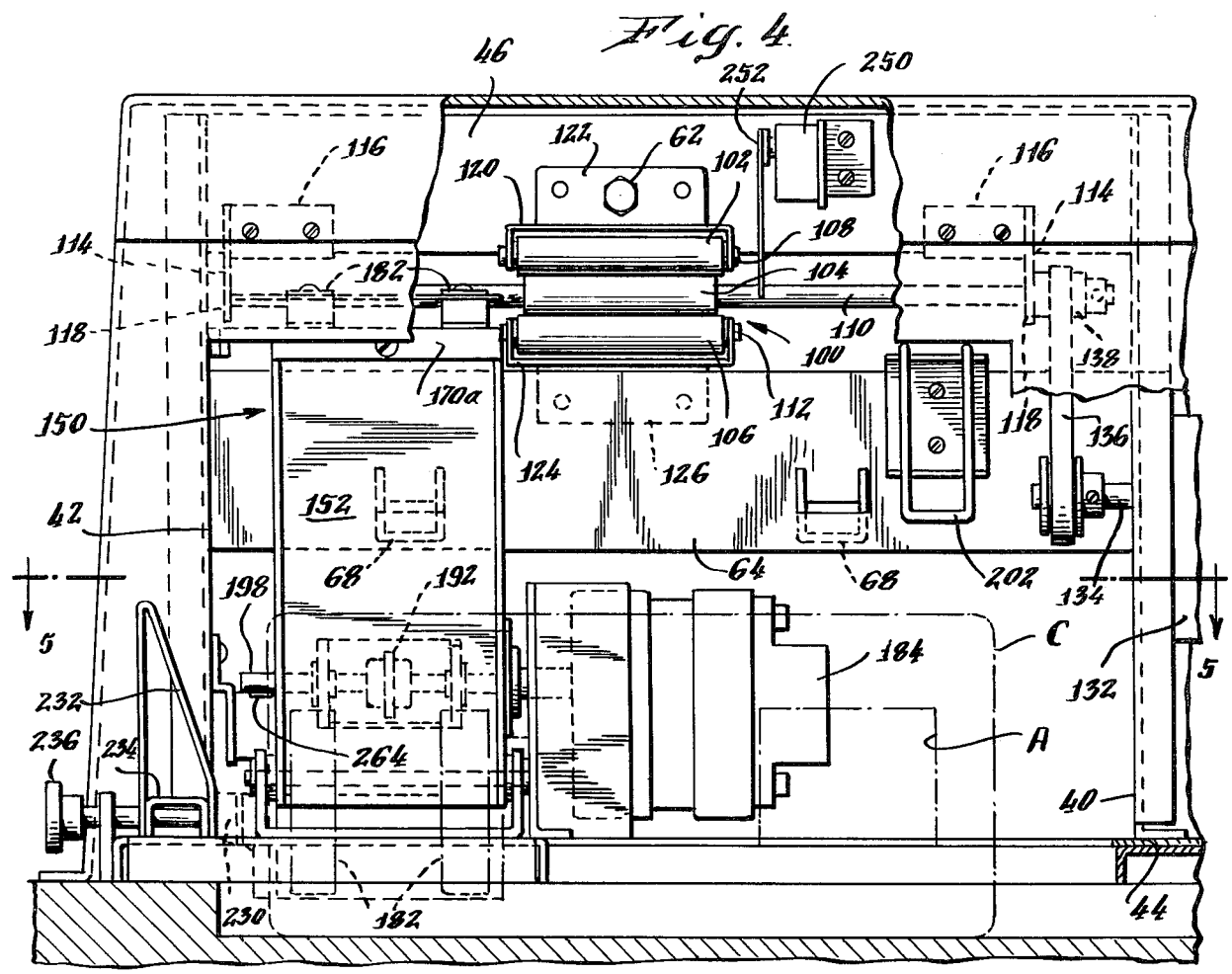
FIG. 4 is a rear elevational view of the card feeding apparatus of the invention, shown partly in cross section and taken from plane 4—4 in FIG. 3, illustrating the feeding and return mechanism and the transfer carriage.
Figure 6:
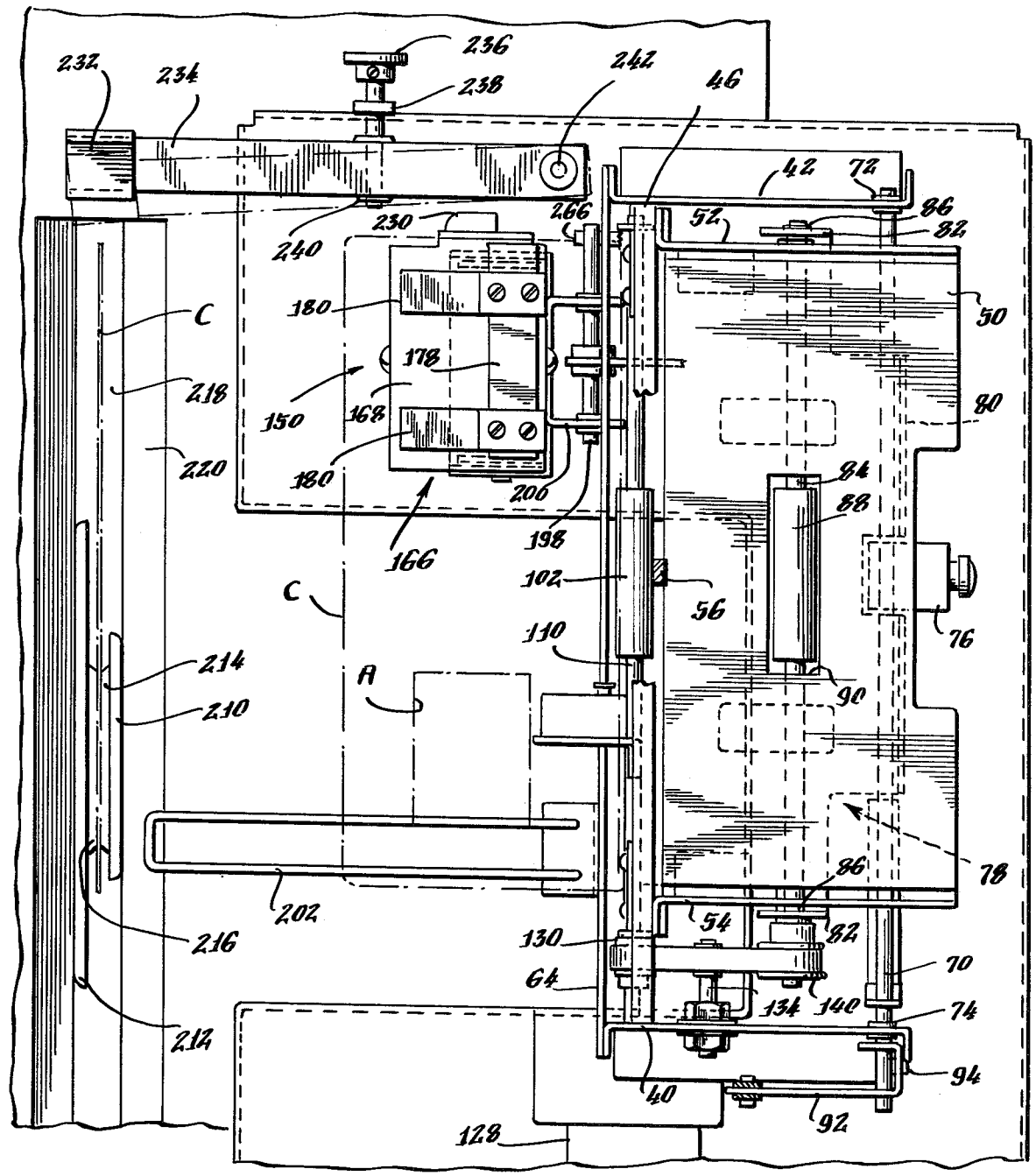
FIG. 6 is a horizontal cross-sectional view taken through discontinuous plane 6—6 in FIG. 3 illustrating the card gripping head of the transfer carriage, a portion of the feeding and returning mechanism, and the cam and follower.

As shown in FIGS. 4 and 7, the housing 22 encloses two vertically upstanding support standards 40 and 42 each of which is secured at its bottom to a horizontal base 44. An upper support plate 46 spans the distance between the standards at their upper end near their rear edge. The origination hopper 33 is mounted between the standards 40 and 42 and comprises a base platform 50 which is supported by two generally L-shaped brackets 52 and 54 secured to the support plate 46 by any suitable means. The L-shaped brackets also serve to define the side margins of the origination hopper 33 as can be seen in FIGS. 6 and 7.

As shown in FIG. 3, the support platform 50 is canted slightly toward the rear of apparatus 12. In this manner, the leading edges of each aperture card in a stack $S_1$ are justified against the support plate 46. Further, an exit slot is defined between the upper surface of the platform 50 and the lower edge of the support bracket 46. The operative width of this slot is defined by an adjustable knife assembly which includes a depending knife 56 that is mounted for vertical movement in a slot 58 formed in the support bracket. The distance between the bottom edge 60 of the knife 58 and the upper surface of the support platform 50 is ordinarily adjusted to be the thickness of a single record card. The knife may be secured in its adjusted position by a setscrew 62.

A second support plate 64 spans the distance between standards 40 and 42 at a location below the first plate and positioned more closely to the rear of the apparatus 12. The collection hopper is defined by a platform 68 which is cantilevered from the second support plate and is canted slightly toward the front of the apparatus.

A limitedly rotatable shaft 70 (FIGS. 3, 6, and 7) is journaled in bushings 72 and 74 mounted respectively in the support standards 40 and 42. A retaining gate 76 is loosely suspended from the shaft 70 to define a forward boundary to the collection hopper 37 and to, accordingly, justify the trailing edges of record cards returned thereto. This gate may be pivoted upwardly and outwardly (FIG. 3) to give the operator access to the collection hopper for removal of cards which have been utilized.

C. THE CARD FEEDING AND RETURNING MECHANISM

As shown in FIGS. 3 and 6, the mechanism for feeding cards from the origination hopper and returning them to the collection hopper comprises a pusher assembly, generally indicated at 78 that includes a support platform 80, secured, for example, by welding, to the shaft 70. The platform is formed with two upstanding ears 82 at its laterally opposing ends. A rotatable shaft 84 is journaled in suitable bushings or bearings 86 mounted in the ears 82. A pusher roll 88 is mounted for rotation with the shaft and is registered with a rectangular hole 90 formed in the base platform 50 of origination hopper 33 (FIG. 6). The pusher roller 88 is mounted first for pivoted movement from a rest position, shown in FIG. 3, to a pusher position, shown in FIG. 11, projecting through the opening 90 into engagement with the bottom card in the stack $S_1$. This first movement of the pusher roller is achieved by pivoting shaft 70 to, in turn, pivot the support plate 80 and the roller mechanism mounted thereon.

The arrangement for effecting pivoted pusher assembly movement is illustrated in FIGS. 6 and 7 and includes a lever arm 92 mounted for rotation on the extreme end of shaft 70 which projects through the standard 40. For example, the lever arm 92 may be held tightly in engagement with the shaft 70 by means of a setscrew 94 or, alternatively, may be keyed or pinned thereto. The lever arm is coupled at its radially extreme end to the armature 96 of a solenoid 98 that is mounted on the standard 40. Therefore, when the solenoid is energized, its armature is drawn upwardly to pivot shaft 70 in a clockwise direction (FIG. 3) to in turn pivot the pusher roller through the opening 90.

Figure 2:
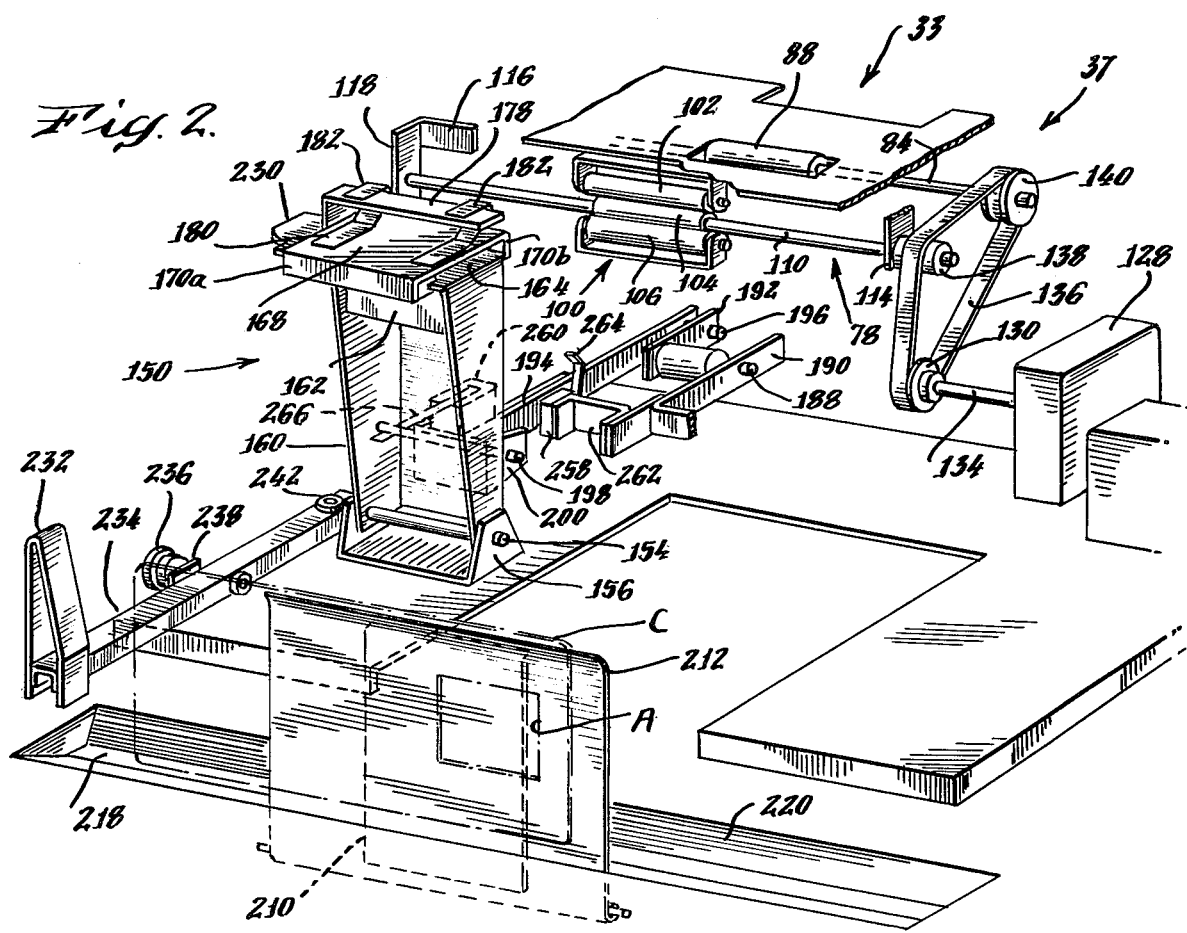
FIG. 2 is an enlarged fragmentary perspective view of the record card delivery apparatus taken from the rear illustrating its main cooperating mechanisms.

Referring to FIGS. 2, 3 and 4, the card feeding and returning mechanism further comprises an array of rollers, generally indicated at 100, that includes three vertically arranged rollers 102, 104 and 106. Each roller is mounted for rotation on respective shafts 108, 110 and 112. The center shaft 110 is journaled between the depending arms 114 of two spaced L-shaped brackets 116 mounted on the upper support plate 46. Suitable bushings or bearings 118 are mounted in the depending arms 114 to facilitate free rotation of the shaft 110. The upper shaft 108, on which the upper roller 102 is mounted, is journaled in an inverted U-shaped bracket 120 having an attachment flange 122 which is secured to the upper support plate 46. Similarly, the shaft 112, on which the lower roller 106 is mounted, is journaled in a U-shaped bracket 124 which is secured to an attachment flange 126 mounted on the lower support plate 64.

Each of the rollers in the array 100 is in circumferential contact with the roller immediately adjacent to it. Accordingly, when one roller is rotated, the roller adjacent to it rotates in the opposite angular direction. The center roller 104 furthermore, has a rubber surface to insure good frictional contact with the upper and lower adjacent rollers.

The feeding and returning mechanism further comprises a motor 128 (FIGS. 2, 6, and 7) which powers a driven gear 130 through a gear train 132. Gear 130 is mounted on a driven shaft 134 which projects through the standard 40. A toothed belt 136 is reeved about the gear 130 and also about a driven gear 138 attached to the extreme end of shaft 110. Through this belt coupling the motor 128 drives the central roller 104 in the counterclockwise direction as seen in FIG. 3. Hence the upper and lower rollers 102 and 106, respectively, are rotated in a clockwise direction by interaction with the central roller.

As can be seen in FIGS. 2 and 6, the toothed belt 136 is also reeved about a driven gear 140 mounted on the extreme end of shaft 84 which drives the pusher roller 88. Therefore, the feed and returning roller array 100 and the pusher roller 88 are driven simultaneously by the same motor 128. Moreover, the central roller 110 of the array 100 and the pusher roller 88 are driven in the same angular direction, namely, counterclockwise as seen in FIG. 3.

The upper two rollers of the array 100 are mounted so that their nip is directly in line with the exit slot from the upper origination hopper. Accordingly, it will be appreciated from FIG. 3, that when solenoid 98 is actuated to pivot the pusher roller 88 into the opening 90, the bottom card in stack S₁ is moved through the exit slot into the nip of the upper two rollers 102 and 104 to be driven leftwardly. In this manner a card may be delivered to a transfer carriage which will be described in greater detail below.

Moreover, as can be seen in FIG. 3, the nip of the bottom pair of rollers 104 and 106 is positioned below the base platform 50 of the origination hopper 33 and accordingly, is arranged to feed a card to the collection hopper. The support plate 80 of the pusher assembly 78 is provided with a deflector finger 142 that directs a card fed rightwardly by the lower two rollers 104 and 106 into the collection hopper to the top of a stack S₂ formed therein (See FIG. 13).

The card feeding and returning mechanism, described in detail above, cooperates with a transfer carriage mechanism to deliver a card to the utilization station 14.

D. THE TRANSFER CARRIAGE MECHANISM

Figure 5:
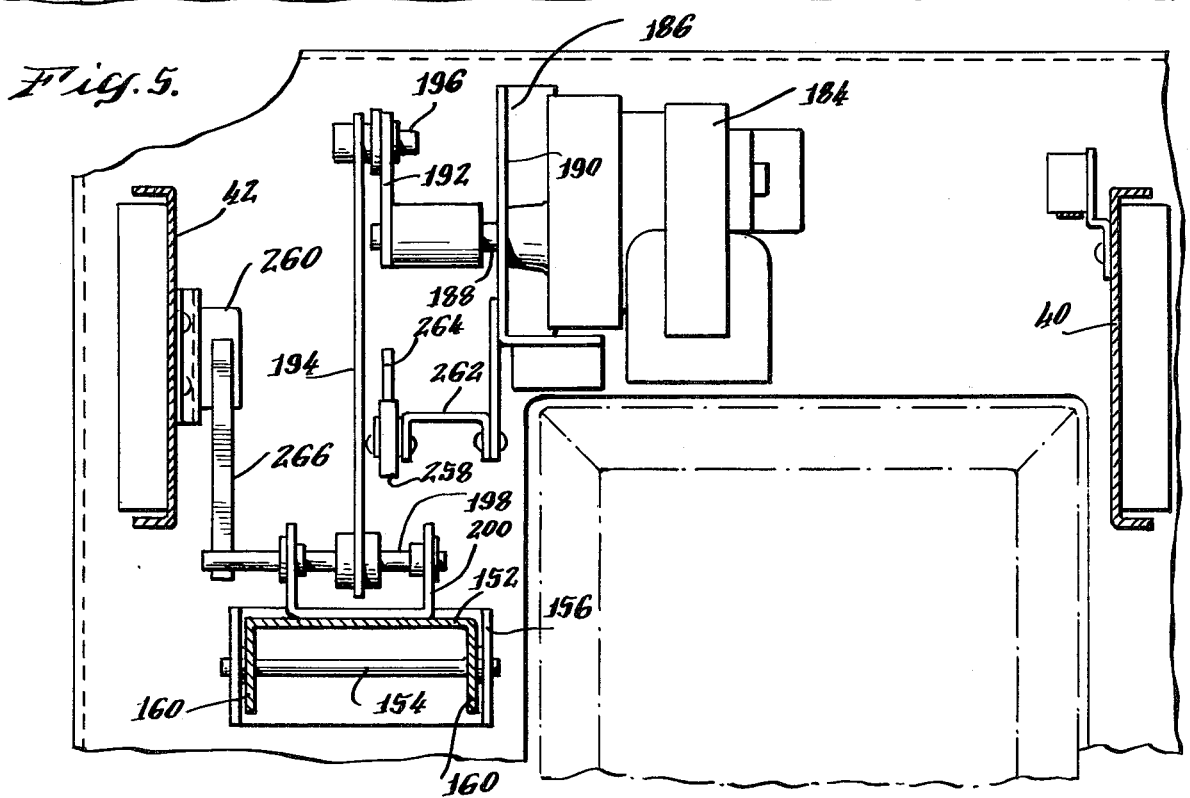
FIG. 5 is a horizontal cross-sectional view taken through plane 5—5 in FIG. 4, illustrating the transfer carriage and the driving mechanism for reciprocally pivoting it.

The transfer carriage mechanism, which is generally indicated at 150 in the Figures, comprises a carriage arm 152 that is generally U-shaped in cross-section as shown specifically in FIG. 5. The carriage arm 152 is mounted for reciprocal pivoted movement on a shaft 154 that is journaled in a U-shaped mount 156 secured to the base 44 of the apparatus 12.

Each side member 160 of the carriage arm 152 is equipped with a radially outwardly directed mounting tab 162 (FIG. 3). A transversely arranged rectangular plate 164 is secured to the tops of the tabs and defines a plane substantially perpendicular to the plane of pivoted carriage arm movement.

The mounting plate supports a record card gripping head, generally indicated at 166 and shown in detail in FIGS. 3 and 8, for sliding movement in a direction lateral or transverse to the plane of pivoted carriage arm movement. The gripping head includes a pressure plate 168 having two short depending edges 170a and 170b, one on each end of its margins in the direction of pivoted carriage arm movement. A C-shaped bushing 172 is mounted on the interior of each of the depending fingers 170 and embraces one lateral or transverse edge of the mounting plate 164. These bushings may desirably be made of an antifriction material such as nylon and are secured to the pressure plate by suitable means such as screws 174. Accordingly, the pressure plate may be moved laterally, that is, leftwardly and rightwardly, as shown in FIGS. 7, 9, and 10 on the mounting plate for purposes of vertically aligning a record card received thereon in the utilization station in a manner to be described below in greater detail. The gripping head is also equipped with means such as a spring (not shown) for urging the pressure plate to its rest position shown in FIG. 7 away from any position to which it is leftwardly shifted as there shown.

The gripping head is also equipped with means for holding a card delivered to it on the pressure plate. This means comprises two flexure springs 176 which are mounted on an open throat, C-shaped support bracket 178 that may be formed integrally with or attached by any suitable means to the pressure plate 168. The open throat of the bracket does not obstruct cards delivered to the gripping head.

Each of the flexure springs 176 is formed with a first pressure exerting portion 180 and a second deflector portion 182. The pressure portion is biased toward the pressure plate 168 to grip a card thereagainst when fed thereto. However, as will be described in greater detail below, the firmness of this gripping is of such magnitude that the card may nevertheless be shifted on the gripping head for alignment purposes.

The deflector portion 182 of each flexure spring 176 extends at a gentle angle into a feed path defined by a card fed from the origination hopper by pusher roll 88, into and out of the nip of the upper two feeding and returning rolls 102 and 104 (FIG. 11). Accordingly, when a card is delivered from the origination hopper by the feeding and returning mechanism, its leading edge encounters the deflector portion 182 of the flexure spring 176. Further movement of the card effected by the upper two rolls 102 and 104 forces the leading edge into the gripping engagement between the pressure portion 180 of the flexure spring and the pressure plate 168 of the gripping head. In addition, the distance of the upper two rolls of the feeding and returning mechanism from the gripping head 166 in the upright or first card receiving and returning position of the carriage 150 (FIGS. 3 and 11) is such that the leading edge of a card fed to the gripping head will project a substantial distance beyond the leading edge 170a of the pressure plate (See FIG. 9, Stage 3 illustrated in FIG. 11).

The carriage arm and attached gripping head may be reciprocated by a driving mechanism from the first card receiving and returning position, shown in FIG. 3 to a second card delivery position, shown in FIG. 12, with the gripping head in operative proximity to the utilization station 14. The driving mechanism for pivoting the carriage and gripping head is shown at best in FIGS. 3, 5 and 7 and includes an arm pivoting motor 184 mounted on a short upstanding support standard 186 between the main support standards 40 and 42. A drive shaft 188 from the motor projects through the web 190 of the standard and a crank 192 is pinned or keyed thereto. The crank is connected to the carriage arm 152 by a link 194 which is coupled at one end to a shaft 196 mounted with the radially extreme end of the crank and its opposite end to a shaft 198 journaled in a U-shaped carriage arm coupling 200. The motor is arranged to rotate the link in clockwise direction, as seen in FIGS. 3, 11, 12, and 13, to pivot the carriage arm and gripping head to the second position shown in FIG. 12.

Limit switches which sense the arrival of the carriage arm at its second position and its return to the first position upon a complete rotation of the crank 192 operate in a fashion to be described below in greater detail. One complete rotation of the crank 192 by the motor 184 from and back to its position shown in FIG. 3 causes the carriage arm and gripping head to reciprocate from its first position shown in FIG. 3 to its second card delivering position shown in FIG. 12 and back to its card receiving and returning position shown in FIG. 13.

As can be seen in FIGS. 4, 9, and 10, an aperture card C is gripped at one edge by the gripping head 166 so that the aperture A and, hence a microfilm frame mounted in it, are unobstructed by any of the apparatus 12. The free frame-bearing end of the card C is guided to the utilization station 14 by a arcuate wire guide 202 which is cantilevered from the second support plate 64 which spans the distance between standards 40 and 42.

As noted above, a card fed to the gripping head when in its card receiving and returning position has a leading edge which projects beyond the extreme of the gripping head pressure plate 168. Reciprocation of the carriage mechanism to its second position with the card at the utilization station both aligns the card therein and sets the card up for later return to the collection hopper. Specifically, in an operation described below in greater detail, the trailing edge of a card received in the gripping head is pushed rightwardly during its delivery to the utilization station so that it may be fed directly into the nip of the lower feeding and returning rollers 104 and 106 for ultimate delivery to the collection hopper 37. Moreover, the vertical edge of a card received in the gripping head is also aligned in the utilization station in a fashion again described in detail below.

E. THE HORIZONTAL CARD ALIGNMENT OPERATION

As shown in FIGS. 3, 4, 6 and 11 through 13, the utilization station 14 of the reader-printer includes two opposing gates 210 and 212 that are part of the reader-printer apparatus 10. The rear-most gate 212 is arranged for pivoted movement away from the front-most gate 210, as shown in FIG. 12, to receive a card delivered to the utilization station. After delivery, the gates close about the card to hold it in proper position for viewing and copying. Each gate 210 and 212 is formed with a rectangular cushion 214 and 216, respectively, and is further formed with an aperture, slightly larger than the aperture A in the card C, which is boardered by the respective cushions. The gates project upwardly from the base 218 of a notch 220 formed in the upper surface of the top of the reader-printer apparatus. This notch, as shown in FIG. 6, is elongated, extending at least as long as the length of a record card. Moreover, the base 218 of the notch constitutes an alignment platform which serves to align the card horizontally in the utilization station when delivered by the transfer carriage mechanism. Specifically, as noted above, when a record card is fed to the gripping head, its leading edge L projects a fixed distance beyond the margin of the gripping head pressure plate (FIGS. 9 and 11). In the preferred embodiment this over-projection is about 9/16 of an inch. Further, when the transfer carriage mechanism is reciprocated to its second card delivery position (FIGS. 10 and 12), the margin of the gripping head approaches the base or alignment platform 218 by a distance less than the over-projection. Again, in the preferred embodiment, this distance is about 7/16 of an inch. Thus, the card, when fed to the gripping head, projects approximately ⅛ of an inch beyond that required for proper alignment in the utilization station. The alignment platform is spaced from the aperture defined collectively in the gates 210 and 212 by the standard distance from the leading edge of the card to the aperture A in it. Accordingly, when the carriage reciprocates to the second position, the leading edge of the card abuts the alignment platform and is shifted in the gripping head by a precise amount required for proper horizontal alignment. (As noted above, the record card is gripped lightly by the flexure spring against the pressure plate of the gripping head so as to permit shifting therein when its leading edge L abuts the alignment platform 218).

Further, the ⅛ inch shift of the card in the direction of pivoted travel of the carriage mechanism is sufficient to permit its trailing edge T to be fed directly into the nip of the lower feeding and returning rollers 104 and 106 upon return of the carriage mechanism to its first receiving and returning position (FIG. 13).

Accordingly, the apparatus of the present invention operates to align a record card automatically when fed to the utilization station of the reader-printer but further both feeds record cards to the carriage mechanism and removes cards from it for return to the collection hopper without a radial change of position of the gripping head. Complex tilting or shifting mechanisms which would lengthen the carriage arm 152 or would shift the feeding and return roller array 100 are unnecessary. Therefore, the apparatus of the present invention performs a relatively complicated sequence of operations using relatively uncomplicated mechanical components.

As noted above the apparatus also operates to align a record card fed to the utilization station in the transverse direction to align a vertical edge of the card.

E. THE TRANSVERSE CARD ALIGNMENT OPERATION

As seen best in FIGS. 8 through 10, the gripping head 166 is equipped on one of its transverse edges with a cam follower 230. A cam surface in the form of a ramp 232 is mounted in the region of the utilization station 14 in the pivoted path with the carriage arm and gripping head of the cam follower. Accordingly, when the carriage mechanism is reciprocated to its second card delivery position (FIGS. 9 and 10), the cam follower engages the cam to shift the gripping head rightwardly.

The amount of shift of the gripping head may be calibrated by adjustment of the cam 232 which is mounted on a pivot arm 234 (FIG. 6). An adjustment screw 236 is threaded into a bracket 238 mounted on the base plate 44 of the apparatus. The free end of the adjustment screw is held in a suitable bushing 240 mounted on the pivot arm 234 so that rotation will shift the cam about the pivot axis 242 of the arm either toward the card receiving gates 210 and 212 or away therefrom. Accordingly, the transverse shift of the gripping head may be calibrated in order to properly align a card received thereon in the utilization station.

Of course, when the gripping head is reciprocated back to its first card receiving and returning position, its internal spring mechanism returns it to its lateral rest position shown in FIGS. 4, 6 and 7.

F. THE SEQUENTIAL OPERATION OF THE APPARATUS OF THE PRESENT INVENTION

The various components of the apparatus of the present invention described above in detail are operated in a timed sequence to feed a record card from the origination hopper to the transfer carriage mechanism which delivers it to the utilization station. Once utilization is complete, the card is returned by the transfer mechanism to the collection hopper.

In general, the sequential operation of the various components is controlled by a number of limit switches which signal the occurrence of various events and then trigger further events. In particular, a first limit switch (not shown) senses the presence of a stack of cards in the origination hopper. Referring to FIGS. 3, 11, and 13, a second limit switch 250, mounted on the upper support plate 46, comprises a finger 252 that depends to a position intersecting the feed path of a record card fed from the origination hopper by the feeding and returning mechanism. Return of cards through the feeding and returning mechanism is sensed by a third limit switch 254 having a finger 256 which projects into the return path of cards returned to the collection hopper. This third limit switch is also mounted on the upstanding support standard 46.

Fourth and fifth limit switches 258 and 260 respectively, (FIGS. 5 and 11 through 13) sense the arrival of the transfer carriage arm 152 at its second position when reciprocated from its first position and further sense the return of the transfer carriage arm to its upright or first position from the second position. In particular, the fourth limit switch 258 is mounted on an extension 262 from the motor support bracket 186. This limit switch includes a finger 264 which projects into the rotating path of the crank 192. The finger is positioned so that when engaged by the crank as shown in FIG. 12 the limit switch 258 is closed to indicate that the transfer carriage is at its second position. Similarly, the fifth limit switch 260 which is mounted on the upright standard 42 comprises a finger 266 which interacts with the shaft 198 to which the crank-operated link 194 is attached. When the transfer carriage is returned to its first position the finger 266 is depressed to close limit switch 260 and thus, indicate that the transfer carriage mechanism has arrived at its first position.

The total operation of the record card delivering apparatus of the present invention may now be described with references to FIGS. 3 and 9 through 14. Initially, the microfilm reader-printer is turned on at time $t_1$. Simultaneously the feeding and returning mechanism motor 128 is turned on. One or more record cards are then loaded through the opening 30 in the top 32 of the apparatus housing 22 into the origination hopper 33 at time $t_2$. This operation closes the card sensing limit switch (not shown) indicating that the apparatus is ready for operation, (Stage 1, FIG. 3).

With cards loaded in the origination hopper, a "Start Cycle" or "Auto Cycle" button 26 is pressed at time $t_3$ which energizes the pusher roller solenoid to pivot the pusher roller 88 into engagement with the bottom card in the stack $S_1$ in the origination hopper. This initiates feed of the record card into the nip of the upper two rollers of array 100 and opens the second limit switch 250, (Stage 2, FIG. 11) at time $t_4$. The leading edge of the card is deflected into engagement between the flexure spring 176 and the pressure plate 168 of the transfer carriage gripping head 166. Once the card has been completely fed from the roller array 100 limit switch 250 is permitted to close at time $t_5$ thereby signaling start up of the transfer carriage motor 184. Reciprocation of the carriage continues through Stage 3, (FIGS. 9 and 11) until it reaches its second position, where the fourth limit switch 258 is closed by interaction between the switch finger 264 and the crank 192 at time $t_6$. This is Stage 4 (FIGS. 10 and 12). Prior to $t_6$, the card holding gates 210 and 212 are opened by internal reader-printer circuitry, to receive a record card delivered by the transfer carriage.

When the card reaches the second position at the utilization station, and the gates close about it at time $t_7$, it is vertically and horizontally aligned by the operations described above in detail. After time $t_7$, whether the apparatus is operating in an autormtic or a manual mode, a print cycle may be initiated whereby the information contained on a microfilm frame is copied for later use.

After the print cycle is completed, the gates are open at time $t_8$ and the transfer carriage motor is again turned on shortly thereafter at time $t_9$. The transfer carriage is reciprocated from the second position back to the first at which time $t_{10}$ (Stage 5, FIG. 13) the fifth limit switch 260 is closed to indicate its arrival. At time $t_{10}$, the trailing edge of the record card carried by the transfer carriage gripping head is fed into the nip of the lower pair of rollers in the roller array 100 and is ultimately delivered to the collection hopper. In being delivered, the card trips the third limit switch 254. If the apparatus is being operated in an automatic mode at this time $t_{11}$, another feeding cycle is begun as at time $t_3$. However, if the cycle is being operated in the manual mode, the start feed button must again be pressed to initiate the cycle a second time.

It can be appreciated from the above description that the apparatus of the present invention feeds record cards from an origination hopper to a utilization station and back to a collection hopper in a manner which does not require complex radial shifting of the transfer carriage and the gripping head. Further, the card when delivered to the utilization station is both aligned vertically and horizontally for proper viewing and copying. Moreover, the horizontal alignment of the card with the alignment platform at the utilization station sets up the trailing edge of the card for return to the feeding and returning mechanism for ultimate delivery to the collection hopper.

Accordingly, though a preferred embodiment of the present invention has been described above in detail, it is to be understood that this is for purposes of illustration. Modifications may be made to the described record card feeding apparatus by those skilled in the art in order to adapt it to particular record card feeding applications.

We claim:

1. An apparatus for feeding record cards to and from a utilization station in a record card utilization machine, said feeding apparatus comprising:
   A. support means including
      1. an origination hopper formed to hold a stack of cards prior to utilization, and
      2. a collection hopper, spaced from said origination hopper, formed to receive cards after utilization;
   B. an alignment platform in the region of the utilization station;
   C. carriage means for receiving a card with at least a portion of a leading edge of the card projecting from said carriage means, for delivering the card to the utilization station and for returning the card for collection in said collection hopper, said carriage means being mounted for reciprocal, pivoted movement between a first card receiving and returning position in the proximity of said hoppers and a second card delivery position in operative proximity to the utilization station;
   D. means for feeding a card from said origination hopper to said carriage means with at least the portion of the leading edge of the card projecting therefrom while in the first position;
   E. motive means for reciprocally pivoting said carriage means from the first position to the second with said leading edge contacting said alignment platform to align said card in the utilization station and back to the first position; and
   F. means for removing a card from said carriage means while in the first position and returning it to the collection hopper.

2. The record card feeding apparatus as claimed in claim 1 further comprising:
   means for aligning an edge of a record card, that extends transversely to a leading edge, delivered to the utilization station for proper utilization by the machine.

3. An apparatus for feeding record cards to and from a utilization station in a record card utilization machine, said feeding apparatus comprising:
   A. support means including
      1. an origination hopper formed to hold a stack of cards prior to utilization, and
      2. a collection hopper, spaced from said origination hopper, formed to receive and stack cards after utilization;
   B. an alignment platform in the region of the utilization station;
   C. means for serially feeding cards from said origination hopper through a feed path;
   D. a carriage mounted for reciprocal movement through an arcuate path between a first card receiving and returning position in the proximity of said hoppers and a second card delivery position in operative proximity to the utilization station, said carriage including
      1. a card gripping head, and
      2. means for deflecting a card fed along the feed path from said feeding means into engagement with said gripping head while in the first position with at least a portion of the leading edge of the card projecting from said gripping head;
   E. motive means for reciprocally moving said carriage from said first position to the second with said leading edge contacting said alignment platform to align the card in the utilization station and back to the first position; and
   F. means for receiving a card from the carriage gripping head and returning it to the collection hopper through a return path.

4. The record card feeding apparatus as claimed in claim 3 wherein said card feeding means comprises:
   1. a driven pusher roller mounted for movement into engagement with the card at one extreme of a stack held in said origination hopper, and
   2. means for moving said pusher roller into said engagement.

5. The record card feeding apparatus as claimed in claim 3 wherein said card feeding means comprises:
   1. two interengaging feed rollers, at least one of which is driven,
   2. pusher means for pushing one card from a stack held in said origination hopper into the nip of said feed rollers to be fed thereby along said feed path.

6. The record card feeding apparatus as claimed in claim 3 wherein said carriage gripping head comprises a pressure plate and wherein said deflecting means comprises at least one flexure spring mounted with said plate and having a pressure exerting portion bearing thereagainst and a deflector portion extending from said pressure exerting portion and intersecting said feed path.

7. The record card feeding apparatus as claimed in claim 3 wherein said card receiving means comprises:
   two interengaging return rollers, at least one of which is driven, said carriage gripping head being arranged in said first position to deliver a card directly into the nip of said return rollers to move the card through the return path.

8. The record card feeding apparatus as claimed in claim 3 wherein said card feeding means and said card receiving means comprise:
   an array of at least three circumferentially interengaged rollers arranged so that adjacent rollers rotate in opposite angular directions, at least one of said rollers being driven, one pair of adjacent rollers coacting to feed cards from their nip to said carriage and the other pair of adjacent rollers coacting to engage a card in their nip and return it to said collection hopper when said carriage is reciprocated back to the first position.

9. An apparatus for feeding record cards to and from a utilization station in a record card utilization machine, said feeding apparatus comprising:
   A. support means including 1. an origination hopper formed to hold a stack of cards prior to utilization, and
2. a collection hopper, spaced from said origination hopper, formed to receive and stack cards after utilization;

B. an alignment platform in the region of the utilization station;

C. a carriage, including a card gripping head, mounted for reciprocal pivoted movement between a first card receiving and returning position in the proximity of said hoppers and a second card delivery position in operative proximity to the alignment platform;

D. means for serially feeding cards from said origination hopper along a feed path to the gripping head of said carriage when in the first position, with a leading edge of the card projecting beyond said head;

E. motive means for reciprocally pivoting said carriage,
1. from the first position to the second with said gripping head spaced from said alignment platform by a distance less than the distance beyond said gripping head that the leading edge of the card projects to thereby cause the leading card edge to abut the alignment platform for proper alignment in the utilization station; and
2. from the second position back to the first;

F. means for receiving a card from the gripping head when in the first position and returning it to the collection hopper through a return path.

10. The record card feeding apparatus as claimed in claim 9 wherein each record card has a trailing edge opposite the leading edge and wherein said gripping head comprises:
a pressure plate, on which a card may be received, having a smaller dimension in the direction of its pivoted movement than the dimension from the leading to the trailing card edge whereby abutment of said leading card edge with said alignment platform causes the trailing card edge to project beyond said pressure plate.

11. The record card feeding apparatus as claimed in claim 10 wherein said receiving means is arranged to engage the trailing edge of a card received on said pressure plate when said carriage is reciprocated to the first position.

12. The record card feeding apparatus as claimed in claim 11 wherein said card feeding means and said card receiving means comprise:
an array of at least three circumferentially interengaged rollers arranged so that adjacent rollers rotate in opposite angular directions, at least one of said rollers being driven, one pair of adjacent rollers coacting to feed cards from their nip to said carriage and the other pair of adjacent rollers coacting to engage a card in their nip and return it to said collection hopper when said carriage is reciprocated back to the first position.

13. The record card feeding apparatus as claimed in claim 12 wherein said carriage and said gripping head are mounted to directly feed the trailing edge of a card into the nip of said other pair of adjacent rollers upon return of said carriage to the first position and wherein said apparatus further comprises:
means for deflecting a card, fed from said origination hopper by said one pair of rollers, to said gripping head while in the first position.

14. The record card feeding apparatus as claimed in claim 12 further comprising:
means for sensing receipt by said gripping head of a card fed from said one pair of rollers.

15. The record card feeding apparatus as claimed in claim 14 wherein said sensing means is a limit switch having a switch element which intersects the card feed path from said one pair of rollers.

16. The record card feeding apparatus as claimed in claim 9 further comprising:
means for sensing arrival of said carriage at the second position and for then interrupting movement thereof by said motive means.

17. The record card feeding apparatus as claimed in claim 9 further comprising:
means for sensing reciprocation of said carriage means to the first position and for then interrupting movement thereof by said motive means.

18. An apparatus for delivering record cards to and from a utilization station in a record card utilization machine, said delivering apparatus comprising:
A. support means including
1. an origination hopper formed to hold a stack of cards prior to utilization, and
2. a collection hopper, spaced from said origination hopper, formed to receive and stack cards after utilization, B. carriage means for receiving a card from said origination hopper, delivering it to the utilization station and returning it to the collection hopper, said carriage means being mounted
1. for reciprocal pivoted movement between a first card receiving and returning position in the proximity of said hoppers and a second card delivery position in operative proximity to the utilization station, and
2. for movement transverse to the plane of its pivoted movement; and C. cam means, mounted at said utilization station, for engaging and moving said carriage means transversely to the plane of its pivoted movement into proper alignment in the utilization station to properly align at least one edge of a card received thereby for utilization by the machine.

19. The record card feeding apparatus as claimed in claim 18 wherein said carriage comprises:
1. an arm mounted for said reciprocal pivoted movement about a pivot axis;
2. a card gripping head mounted on said arm, at a location spaced from said pivot axis, for said transverse movement, and
3. follower means associated with said gripping head for engaging said cam means when said carriage means is reciprocated to the second position.

20. The record card feeding apparatus as claimed in claim 19 wherein said arm is equipped with a transverse plate and wherein said gripping head comprises a pressure plate mounted for transverse sliding movement on said transverse plate from and back to a home position.

21. The record card feeding apparatus as claimed in claim 20 further comprising:
means for urging said pressure plate to its home position.

22. The record card feeding apparatus as claimed in claim 18 further comprising:
means for adjusting the location of said cam means to insure proper alignment of said carriage means and a card received thereon in the utilization station.

23. An apparatus for feeding record cards to and from a utilization station in a record card utilization machine, said feeding apparatus comprising:
- A. an origination hopper formed to hold a stack of cards prior to utilization;
- B. a collection hopper, spaced from said origination hopper, formed to receive cards after utilization;
- C. an alignment platform in the region of the utilization station;
- D. carriage means for receiving a card, being formed to permit at least one of the leading edges and an opposing trailing edge of a card so received to project therefrom, for delivering the card to the utilization station and for returning the card to be collected in said collection hopper, said carriage means being mounted for reciprocal movement between a first card receiving and returning position in the proximity of said hoppers and a second card delivery position in operative proximity to the utilization station;
- E. means for feeding a card from said origination hopper to said carriage means with at least a portion of the leading edge of the card projecting therefrom while in the first position;
- F. means for removing a card from said carriage means while in the first position and returning it to the collection hopper; and
- G. motive means for reciprocally moving said carriage means from the first position to the second and contacting the leading edge of the card with said alignment platform to shift the card and cause the trailing edge thereof to project from said carriage means, and for moving said carriage means back to the first position and delivering the trailing edge of the card to said removing means.

* * * * *